United States Patent [19]
Holmes

[11] Patent Number: 5,935,219
[45] Date of Patent: Aug. 10, 1999

[54] MESSAGE HANDLING IN DATA PROCESSING APPARATUS

[75] Inventor: Keith Holmes, Dublin, Ireland

[73] Assignee: International Business Machines Corporation, Armonk, N.Y.

[21] Appl. No.: 08/255,544

[22] Filed: Jun. 6, 1994

Related U.S. Application Data

[63] Continuation of application No. 07/717,450, Jun. 19, 1991, abandoned.

[30] Foreign Application Priority Data

Jun. 28, 1990 [EP] European Pat. Off. ............. 90307117

[51] Int. Cl.$^6$ ..................................................... G06F 17/30
[52] U.S. Cl. ............................................................ 709/303
[58] Field of Search ....................... 364/DIG. 1, DIG. 2; 395/400, 425, 700, 683, 200.3; 707/103; 709/303

[56] References Cited

U.S. PATENT DOCUMENTS 5,202,981  4/1993  Shackelford ............................. 395/600
5,212,778  5/1993  Dally et al. ............................... 395/400

OTHER PUBLICATIONS

Microsoft Press Computer Dictionary, $2^{nd}$ Edition, 1993, pp. 109, 255, 285 and 286.

A. P. Black et al, "Implementing Location Independent Invocation", Proc. of the 9th Internat'l Conf. on Distributed Computing Systems, Jun. 1989, pp. 550–559.

P. Dasgupta et al, "The Clouds Distributed Operating System", Proc. of the 8th Internat'l Conf. on Distributed Computing Systems, Jun. 1988, pp. 2–9.

N. Gammage et al, "XMS: A Rendezvous–Based Distributed System Software Architecture", IEEE Software, vol. 2, No. 3, May 1985, pp. 9–19.

*Primary Examiner*—Maria N. Von Buhr
*Attorney, Agent, or Firm*—Mark S. Walker

[57] ABSTRACT

The invention concerns the transfer of messages between objects within an OOP program. Each message is transmitted to a message filter which then chooses the most appropriate mechanism to transmit that message to the destination object. The path chosen could be a system messaging technique for messages of a type to be transmitted anywhere within the computer or alternatively could be in the form of a direct call for messages to be transmitted to objects within the same program thread. The message path best suited to the message type and destination object is used to transmit the message.

25 Claims, 2 Drawing Sheets

MESSAGE HANDLING IN DATA PROCESSING APPARATUS

This is a continuation of application Ser. No. 07/717,450 filed Jun. 19, 1991 now abandoned.

FIELD OF THE INVENTION

This invention relates to the field of data processing systems and methods. More particularly, this invention relates to the way messages are passed between different parts of a computer program running upon a data processing apparatus.

BACKGROUND ART

There are a number of known techniques for producing computer programs. The classical technique is to produce a program as a sequential list of instructions to be executed by the computer. More recently so called 'Object Oriented Programming' (OOP) languages and programs have been developed. Examples of such programming languages are Smalltalk and C++. An example of an OOP program is the Presentation Manager part of the Operating System/2 program produced by International Business Machines Corporation (Presentation Manager and Operating System/2 are trademarks of International Business Machines Corporation). One way of defining an OOP program is that with OOP both the data and the code that manipulates that data are compartmentalized into so called objects. These objects interact by exchanging messages which may comprise data, instructions or both. There are strong advantages in producing computer programs in such a manner, e.g. it becomes easier to make minor changes to a program for maintenance or updating purposes (the effects are localized), and objects from one program may be reused in another program reducing the work needed to produce new programs. It will be appreciated that compartmentalizing a program in this way introduces a heavy dependence upon messages being passed between the objects.

The types of languages and programs available fall into two categories; statically bound languages such as C++ and dynamically bound languages such as Smalltalk. With a program written in Smalltalk a name or pointer to the destination of each message is included within the program, but the precise location of that message is determined at the time the message is generated (run time determination of message destination). This can be contrasted with the compiled programs in which the precise destination of each message is determined when the program is complied so that no such processing need be carried out whilst the compiled program is running. Dynamic binding allows greater flexibility but incurs a performance penalty, whereas compiled programs run faster but are less flexible.

Another subdivision can be drawn between different types of dynamic binding. One known technique is for the program to have its own specific message handling routine which is called directly (an example of such an approach is given in Brad Cox's book 'OOP an Evolutionary Approach'). This technique is comparatively fast, but means that a separate way of sending nonstandard messages such as user input to objects within the program must be provided.

An alternative is to use a system messaging technique. When working with a computer running an operating system which provides system messaging for applications then these facilities can be used by the OOP program which then need not have its own specific message handling routine. An example of this later environment is the Presentation Manager portion of the Operating System/2 computer program mentioned above. This technique provides an elegant way of bringing system supplied messages into the program, but suffers from the disadvantage of being relatively slow compared to using a message handling routine within the OOP program itself.

SUMMARY OF THE INVENTION

The invention is concerned with the problem of providing a fast and yet flexible technique of sending messages between objects within a dynamically bound OOP program.

Viewed from one aspect the invention provides a data processing apparatus for executing a computer program comprising a plurality of objects including data and code for manipulating said data, and means for transferring messages between said objects, characterized by message path selection logic responsive to message type to select one of a plurality of paths for transfer of a message between objects.

The invention may be thought to provide a filter through which messages being sent by objects are passed. The filter detects the type of message being sent (e.g. to which object it is being sent) and then determines the most appropriate path. If the message is being sent to an object in the same thread then it will be most efficiently transferred using a direct call. Alternatively, if the message is to drive an I/O device then this could not be handled by the simple fast message handler and the message would be transferred using a system message at the operating system application program interface level. The invention provides a way of gaining the speed of a direct call for intrathread messages whilst retaining the flexibility afforded by system messages for the less common messages requiring more complex handling.

In preferred embodiments of the invention one of said plurality of paths uses system messages provided by an operation system program installed on said data processing apparatus. This feature allows easy access to features such as asynchronous messaging and messaging between different threads which are often built into operating systems.

Preferred embodiments of the invention may also be such that one of said plurality of paths uses a direct call within said computer program. The special purpose messaging handling code associated with the computer program can be optimized to handle messages for that program that meet certain requirements, e.g. intrathread messages.

In preferred embodiments of the invention said message path selection logic detects whether a message is directed to an object outside of said computer program. In this way system messages produced by the computer program may be detected and directed via the appropriate system messaging technique.

A further feature of preferred embodiments is that said message path selection logic detects whether a message is directed outside of the currently executing thread of said computer program. In this way interthread messages may be detected and directed by the appropriate system messaging technique.

Another feature of preferred embodiments is that said message path selection logic detects whether a message is one of a predetermined group of messages. In this way specific messages that are neither system messages or interthread messages may be detected and directed by the appropriate system messaging technique.

Viewed from a second aspect the invention provides a method of executing a computer program comprising a plurality of objects including data and code for manipulating said data, including the step of generating a message for transferring between objects, and characterized by the further steps of detecting message type of said generated message, and transferring said message between objects via one of a plurality of message paths in response to said detected message type.

An embodiment of the invention will now be described, by way of example only, with reference to the accompanying drawings in which:

DESCRIPTION OF THE PREFERRED EMBODIMENT

Figure 1:
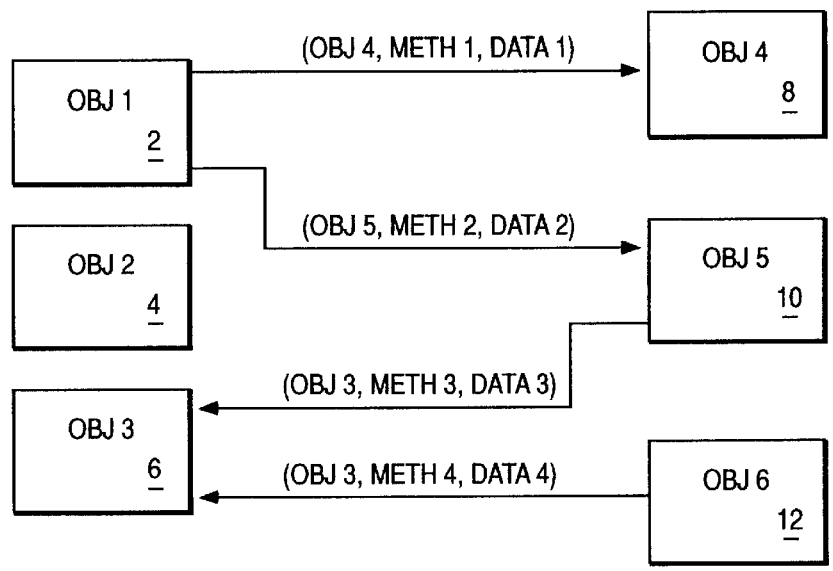
FIG. 1 schematically illustrates an OOP program.

FIG. 1 shows a plurality of "objects" 2, 4, 6, 8, 10, 12 within an Object Oriented Programming (OOP) program of the type with which the present invention is concerned. Each object within the program comprises data compartmentalized with the methods or code for manipulating that data. As the program executes the objects 2, 4, 6, 8, 10, 12 exchange "messages". Each message includes the name of the intended destination object, the name of the method to be invoked in the destination object to process the message, and the data to be processed by the destination object. The message format is not rigid and different OOP programs may use different formats, and different formats may even be used within the same program. It will be seen that any object is free to exchange a message with any other object.

Figure 2:
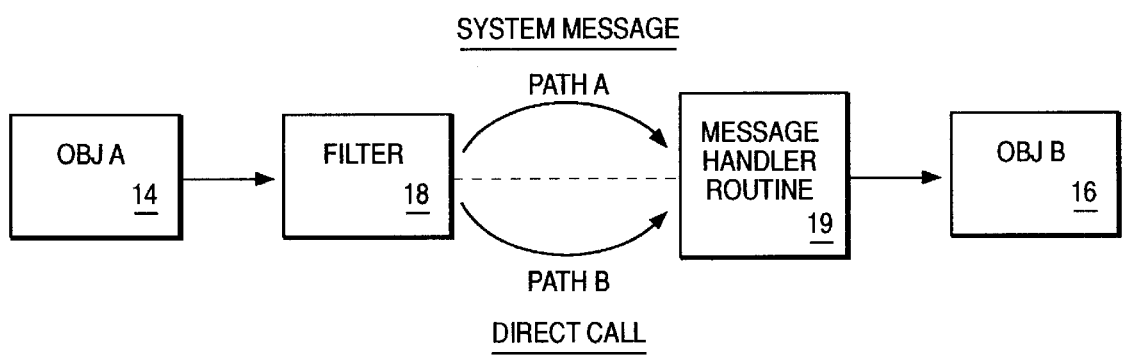
FIG. 2 schematically illustrates the operation of an embodiment of the invention.

FIG. 2 illustrates an embodiment of the invention. Object A 14 is sending a message to Object B 16. Object A 14 sends this message to message path selection logic/filter logic 18. Filter logic 18 then detects the type of message it has received. If the received message is of a first type (e.g. a system message) then the message is transmitted to Object B 16 via Path A using a system messaging call. If the filter logic 18 detects that the message is of a different type (e.g. intrathread message) then the message is transmitted to Object B 16 via another message path such as a direct call via Path B for that OOP program. Both Path A and Path B converge at a message handler routine 19 before being passed to Object B.

Figure 3:
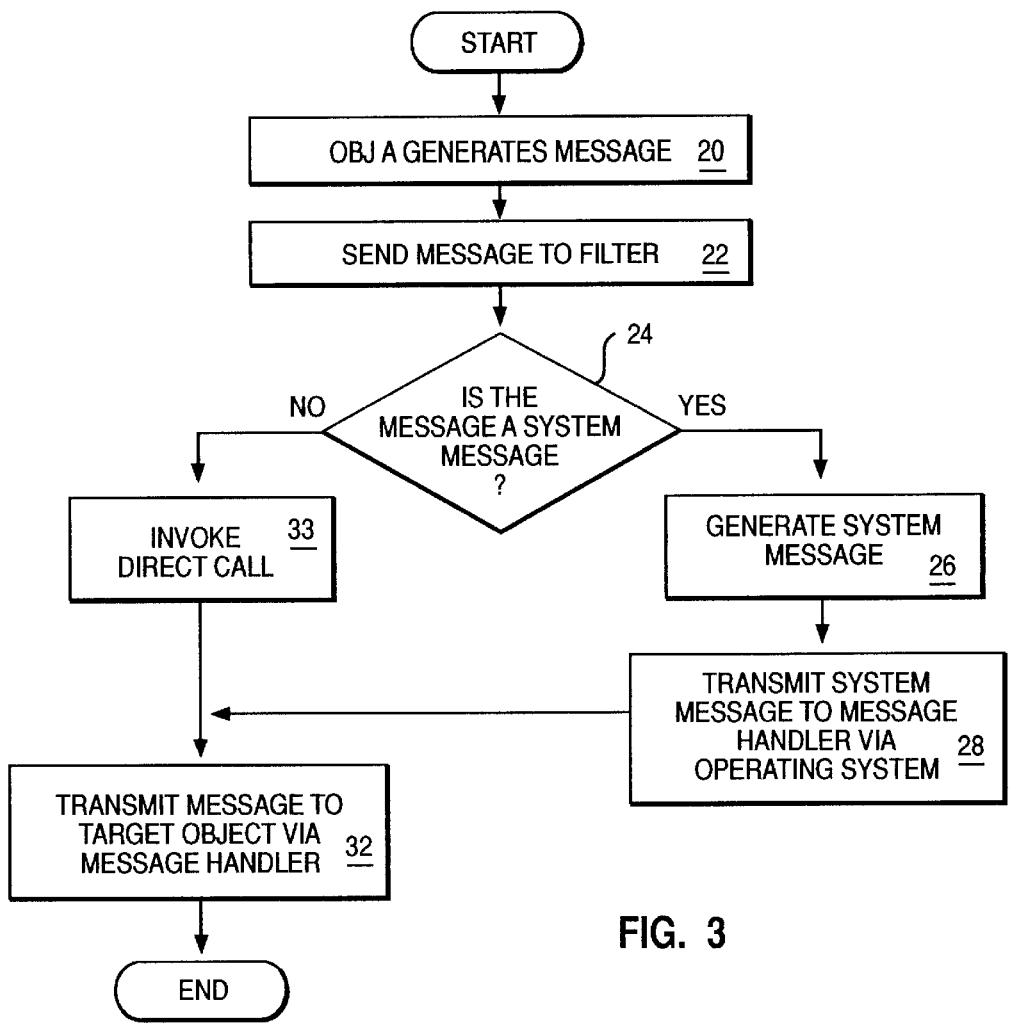
FIG. 3 is a flow diagram illustrating the operation of an embodiment of the invention.

FIG. 3 shows a flow diagram for an embodiment of the invention. Steps 20 and 22 generate the message and send a message to the filter logic 18. At step 24 the filter logic 18 determines the message type, in this case determining simply whether the message is a system message. If the message is a system message then at step 26 the filter logic 18 generates the appropriate system message and at step 28 transmits this system message to the message handler via the operating system mechanisms. If the message is not a system message then step 33 invokes a direct call to the message handler. In both cases, at step 32 the message handler transmits the message to the target object.

An example of an environment in which the present invention may be embodied is the Presentation Manager portion of the Operating System/2 computer program discussed earlier. Presentation Manager provides system messaging in which the programmer writes instructions in the form of WinSendMessage(obj,msg,mp1,mp2). One way of transferring messages between objects would be to send all messages via a system messaging technique. This approach would be inefficient and slow. Instead, the programmer issues instructions to transmit all messages by creating a SEND command of the form SEND(obj,msg,mp1,mp2). A single routine called "MsgHandler" is registered to be the procedure for all messages created by the OOP program. The function SEND can be implemented thus;

```
SEND(HWND obj, MESSAGE msg, MPARAM mp1, MPARAM mp2)
{
    If filterCondition(obj, msg)
        MsgHandler(obj,msg,mp1,mp2);
    else
        WinSendMessage(obj,msg,mp1,mp2);
}
```

If the function filterCondition returns TRUE the MsgHandler will be called without the overhead of system messaging. Otherwise system messaging will be used.

The definition of the filter condition defined by the function filterCondition is vital. A simple example may be "if it is not a system message" implemented thus:

define filterCondition(a,b) b>WM_USER ? TRUE:FALSE which would be extremely fast. This implementation would allow applications that run within a single thread to send messages via a high speed direct call but would still allow Presentation Manager messages to be sent to all the windows within the system if necessary.

More typical types of conditions may be:

"If its not a system message AND the thread ID of the sender <> thread ID of the receiver".

The thread ID of the sender is available because the object that sent the message is known. Because we also can read from the message the object the message is being sent to the thread ID of the target object can be determined.

Another example is:

"If its not a system message AND not one of these messages".

A switch can be used for pre-registered messages which are known to the system designers as being messages which may cross threads. An example of this is if most of the application runs in one thread and some other thread is used to process I/O on a sequential file, then the pre-registered messages may only consist of openFile, closeFile, readNext and write. All other application messages would not incur the speed penalty associated with system messages.

Figure 4:
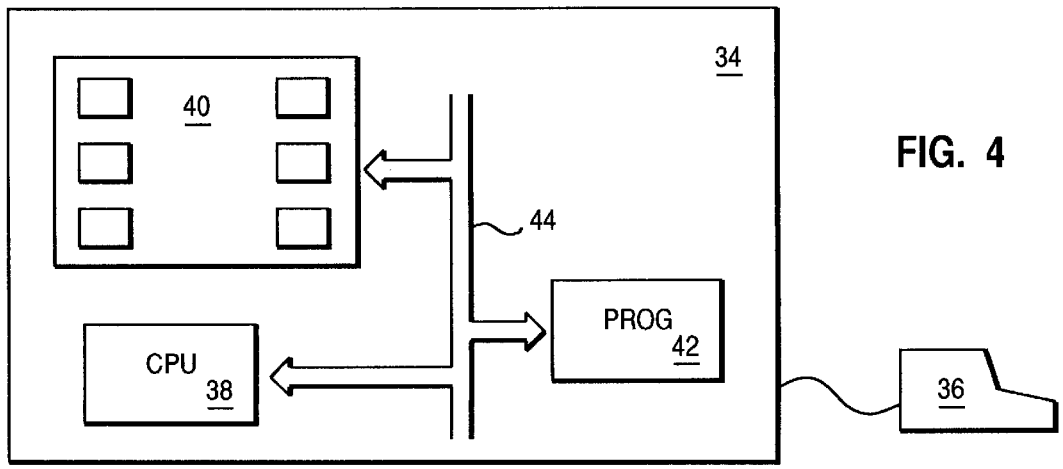
FIG. 4 illustrates a general purpose computer of the type in which the invention may be embodied.

FIG. 4 illustrates a data processing system within which the invention can be implemented. A processor 34 is connected to a display and input terminal 36. The processor 34 includes a central processor unit 38, a OOP program store 40, a control program store 42 and a bus 44 linking the other elements of the processor 34 together. The central processor unit 38 acting under the control of the instructions stored within the control program store 42 acts to perform the functions of the means for transferring messages between objects within the OOP program and the data path selection logic. The control program 42 implements the SEND function and the filter condition.

It will be appreciated that whilst the present embodiment has been described in terms of a programmed general purpose computer, it would be possible (although in practice difficult and expensive) to implement the invention in special purpose hardware. It will also be appreciated that a number of computer program languages could be used to program the general purpose computer to operate in accordance with the invention.

I claim:

1. A data processing apparatus for executing two or more computer programs, said data processing apparatus including memory and processor means, said two or more computer programs each including a plurality of objects having data and program code for manipulating said data, said apparatus comprising:

message path means for transferring a message between a sending and a receiving object, said message having a message type and message content, said message path means including a first message transfer means for transferring said message between objects within the same computer program and a second message transfer means for transferring said message to an object in a computer program different from the computer program of the sending object; and message path selection logic external to said sending and receiving objects and responsive to said message type of said message being transferred by said message path means to select said first or second message transfer means for transferring said message between said objects.

2. A data processing apparatus as claimed in claim 1, wherein said second message transfer means comprises system messages provided by an operation system program installed on said data processing apparatus.

3. A data processing apparatus as claimed in claim 2, wherein said first message transfer means for transferring messages between objects within the same computer program is a direct call within said computer program.

4. A data processing apparatus as claimed in claim 3, wherein said message path selection logic tests whether a message is directed to a receiving object outside of said computer program containing said sending object and selects said second message transfer means if said test detects a receiving object outside of said computer program and selects said first message transfer means otherwise.

5. A data processing apparatus as claimed in claim 4, wherein said one or more computer programs are executed by one or more execution threads of said processor means and said message path selection logic detects whether a message is directed outside of a currently executing thread of said computer program, and, if so, selects said second message transfer means for transferring said message.

6. A data processing apparatus as claimed in claim 3, further comprising means for associating either said first or second message transfer means with each of a plurality of predetermined groups of message and wherein said message path selection logic detects whether a message is in one of said plurality of predetermined groups of messages and, if so, selects the single message transfer means associated with said predetermined group of messages.

7. A data processing apparatus as claimed in claim 4, further comprising means for associating either said first or second message transfer means with each of a plurality of predetermined groups of message and wherein said message path selection logic detects whether a message is in one of said plurality of predetermined groups of messages and, if so, selects the single message transfer means associated with said predetermined group of messages.

8. A data processing apparatus as claimed in claim 2, wherein said one or more computer programs are executed by one or more execution threads of said processor means and said message path selection logic detects whether a message is directed outside of a currently executing thread of said computer program, and, if so, selects said second message transfer means for transferring said message.

9. A data processing apparatus as claimed in claim 3, wherein said one or more computer programs are executed by one or more execution threads of said processor means and said message path selection logic detects whether a message is directed outside of a currently executing thread of said computer program, and, if so, selects said second message transfer means for transferring said message.

10. A data processing apparatus as claimed in claim 2, further comprising means for associating either said first or second message transfer means with each of a plurality of predetermined groups of message and wherein said message path selection logic detects whether a message is in one of said plurality of predetermined groups of messages and, if so, selects the single message transfer means associated with said predetermined group of messages.

11. A data processing apparatus as claimed in claim 1, wherein said first message transfer means for transferring messages between objects within the same computer program is a direct call within said computer program.

12. A data processing apparatus as claimed in claim 11, wherein said message path selection logic tests whether a message is directed to a receiving object outside of said computer program containing said sending object and selects said second message transfer means if said test detects a receiving object outside of said computer program and selects said first message transfer means otherwise.

13. A data processing apparatus as claimed in claim 12, wherein said one or more computer programs are executed by one or more execution threads of said processor means and said message path selection logic detects whether a message is directed outside of a currently executing thread of said computer program, and, if so, selects said second message transfer means for transferring said message.

14. A data processing apparatus as claimed in claim 12, further comprising means for associating either said first or second message transfer means with each of a plurality of predetermined groups of message and wherein said message path selection logic detects whether a message is in one of said plurality of predetermined groups of messages and, if so, selects the single message transfer means associated with said predetermined group of messages.

15. A data processing apparatus as claimed in claim 11, wherein said one or more computer programs are executed by one or more execution threads of said processor means and said message path selection logic detects whether a message is directed outside of a currently executing thread of said computer program, and, if so, selects said second message transfer means for transferring said message.

16. A data processing apparatus as claimed in claim 11, further comprising means for associating either said first or second message transfer means with each of a plurality of predetermined groups of message and wherein said message path selection logic detects whether a message is in one of said plurality of predetermined groups of messages and, if so, selects the single message transfer means associated with said predetermined group of messages.

17. A data processing apparatus as claimed in claim 1, wherein said message path selection logic tests whether a message is directed to a receiving object outside of said computer program containing said sending object and selects said second message transfer means if said test detects a receiving object outside of said computer program and selects said first message transfer means otherwise.

18. A data processing apparatus as claimed in claim 17, wherein said one or more computer programs are executed by one or more execution threads of said processor means and said message path selection logic detects whether a message is directed outside of a currently executing thread of said computer program, and, if so, selects said second message transfer means for transferring said message.

19. A data processing apparatus as claimed in claim 17, further comprising means for associating either said first or second message transfer means with each of a plurality of predetermined groups of message and wherein said message path selection logic detects whether a message is in one of said plurality of predetermined groups of messages and, if so, selects the single message transfer means associated with said predetermined group of messages.

20. A data processing apparatus as claimed in claim 1, wherein said one or more computer programs are executed by one or more execution threads of said processor means and said message path selection logic detects whether a message is directed outside of a currently executing thread of said computer program, and, if so, selects said second message transfer means for transferring said message.

21. A data processing apparatus as claimed in claim 20, further comprising means for associating either said first or second message transfer means with each of a plurality of predetermined groups of message and wherein said message path selection logic detects whether a message is in one of said plurality of predetermined groups of messages and, if so, selects the single message transfer means associated with said predetermined group of messages.

22. A data processing apparatus as claimed in claim 1, further comprising means for associating either said first or second message transfer means with each of a plurality of predetermined groups of message and wherein said message path selection logic detects whether a message is in one of said plurality of predetermined groups of messages and, if so, selects the single message transfer means associated with said predetermined group of messages.

23. A method of operating a data processing system having a processor and memory and able to execute a plurality of computer programs each comprising a plurality of objects including data and code for manipulating said data, said data processing system having a plurality of message paths for transferring messages between objects within a computer program or in different computer programs, said method comprising the steps of:

generating a message between a first and a second of said plurality of objects, said message having a message type and message content;

detecting, independent of said first or second objects, the message type of said generated message; and transferring said message between objects via one of said plurality of message paths in response to said detected message type.

24. An apparatus for executing a plurality of computer programs each comprising a plurality of objects including data and code for manipulating said data, said apparatus comprising:

generating means for generating a message for transferring between at least two of said plurality of objects, said message having a message type and message content;

detecting means for detecting the message type of said generated message, said detecting means being independent of said at least two objects; and transferring means for transferring said message between objects via one of a plurality of message paths in response to said detected message type.

25. A method of routing messages in a computer system having a plurality of objects having data and program code for manipulating said data, said objects organized into a plurality of computer programs, said objects each generating messages to others of said objects to cause those other objects to execute, said messages having a message type and message content, the method comprising the steps of:

testing the message type to determine a destination object for said message type of message routing, said testing being performed external to the generating object;

directly calling program code if said test determines the message is for an object within the same computer program as the object sending the message; and routing said message using a system message router if said test determines the message is for an object outside of the same computer program.

* * * * *